US010129218B2

(12) United States Patent
Temme

(10) Patent No.: US 10,129,218 B2
(45) Date of Patent: Nov. 13, 2018

(54) METHOD AND SYSTEM FOR RECEIVING, PROCESSING, STORING AND SENDING DATA OF INTERNET CONNECTED DEVICES

(71) Applicant: Nicolaas Gustav Temme, Amsterdam (NL)

(72) Inventor: Nicolaas Gustav Temme, Amsterdam (NL)

( * ) Notice: Subject to any disclaimer, the term of this patent is extended or adjusted under 35 U.S.C. 154(b) by 53 days.

(21) Appl. No.: 14/990,820

(22) Filed: Jan. 8, 2016

(65) Prior Publication Data

US 2017/0201494 A1 Jul. 13, 2017

(51) Int. Cl.

| G06F 15/16 | (2006.01) |
|---|---|
| G06F 15/173 | (2006.01) |
| H04L 29/06 | (2006.01) |
| H04L 29/08 | (2006.01) |
| G06F 21/60 | (2013.01) |
| G06F 21/50 | (2013.01) |
| H04W 12/02 | (2009.01) |
| H04W 4/70 | (2018.01) |

(52) U.S. Cl.
CPC .......... *H04L 63/0428* (2013.01); *G06F 21/50* (2013.01); *G06F 21/602* (2013.01); *H04L 67/10* (2013.01); *H04L 67/20* (2013.01); *H04W 4/70* (2018.02); *H04W 12/02* (2013.01)

(58) Field of Classification Search
None
See application file for complete search history.

(56) References Cited

U.S. PATENT DOCUMENTS

| 8,839,022 B2 | 9/2014 | He | |
|---|---|---|---|
| 2002/0150243 A1* | 10/2002 | Craft | H04L 63/0823 380/201 |
| 2003/0007646 A1* | 1/2003 | Hurst | H04N 7/1675 380/285 |
| 2007/0294368 A1* | 12/2007 | Bomgaars | H04L 41/22 709/217 |

(Continued)

OTHER PUBLICATIONS

"Tner Says the Internet of Things Installed Base Will Grow to 26 Billion Units by 2020" Dec. 12, 2013, Gartner, Inc. http://www.gartner.com/newsroom/id/2636073 [Accessed Jan. 2, 2015].

(Continued)

*Primary Examiner* — Kenny S Lin

(57) ABSTRACT

A method and system for receiving, processing, storing and sending data of internet connected devices, within an individual encrypted user environment. In a setup process the device sends a request to a server system to connect to the user environment. The server then presents a web page to the user containing the details of this request. The user can subsequently allow or not allow the device to connect to the user environment. If the user allows the device to send data, the application is searched within the user environment on the server system for correctly receiving and sending data from and to this device. In a use example an application running within the individual environment on the server system collects, processes or sends sensor data from devices connected to the individual environment and other applications within the same user environment.

12 Claims, 10 Drawing Sheets

(56) References Cited

U.S. PATENT DOCUMENTS

| | | | | |
|---|---|---|---|---|
| 2007/0300291 | A1* | 12/2007 | Bomgaars | H04L 12/2856 726/3 |
| 2008/0066181 | A1* | 3/2008 | Haveson | H04N 21/4788 726/26 |
| 2013/0311594 | A1* | 11/2013 | Luna | H04L 43/065 709/213 |
| 2014/0310522 | A1* | 10/2014 | Bomgaars | H04L 12/6418 713/168 |
| 2016/0165663 | A1* | 6/2016 | Shanmugam | H04W 76/10 370/338 |
| 2016/0315923 | A1* | 10/2016 | Riscombe-Burton | H04W 12/04 |
| 2017/0026382 | A1* | 1/2017 | Trigger | H04L 47/70 |

OTHER PUBLICATIONS

Porter, Michael E., and James E. Heppelmann. "How Smart, Connected Products Are Transforming Competition." Harvard Business Review 92, No. 11 (Nov. 2014): 64-88.
"Unlocking the Value of Personal Data: From Collection to Usage." Feb. 2013, World Economic Forum Report, http://www3.weforum.org/docs/WEF_IT_UnlockingValuePersonalData_CollectionUsage_Report_2013.pdf [Accessed Jan. 6, 2015].
Bird, J. "Need-to-know: A guide to the internet of things", FT, May 22, 2013, The Financial Times Ltd. http://www.ft.com/cms/s/0/daf3a2e8-bbc9-11e2-82df-00144feab7de.html [Accessed Jan. 6, 2015].
Higginbotham, S. "CES 2013: Connected Devices and the Internet of Things" Bloomberg Businessweek, Jan. 3, 2013, Bloomberg L.P. http://www.businessweek.com/articles/2013-01-03/ces-2013-connected-devices-and-the-internet-of-things [Accessed Jan. 6, 2015].
Wohlsen, M. "How to Keep the Internet of Things From Repeating AOL's Early Blunders" Wired, Sep. 7, 2014 http://www.wired.com/2014/07/how-to-keep-the-internet-of-things-from-repeating-aols-early-blunders/ [Accessed Jan. 6, 2015].
"Privacy: Hiding from big data." Jun. 7, 2014, Economist Technology Quarterly, 2014 (Q2) http://www.economist.com/news/technology-quarterly/21603233-it-security-increasing-commercial-use-personal-data-and-multiple [Accessed Jan. 6, 2015].
Wohlsen, M. "The Internet of Things Is Far Bigger Than Anyone Realizes." Wired, Nov. 11, 2014 http://www.wired.com/2014/11/the-internet-of-things-bigger/ [Accessed Jan. 6, 2015].
Oram, A. "Hurdles to the Internet of Things prove more social than technical." O'Reily Radar, Feb. 27, 2014, O'Reilly Media, Inc. http://radar.oreilly.com/2014/02/hurdles-to-the-internet-of-things-prove-more-social-than-technical.html [Accessed Jan. 6, 2015].

* cited by examiner

|  | Available applications |
|---|---|
| 121 | The following applications are available to install. Applications are sorted by their main category. |

| 122 | RECEIVING INPUT |
|---|---|

123
- 123a — Home Appliances Thermostat
- 123b — Company:    Home Appliances
- 123c — Categories:  Receiving input (main),
                      Data processing Short description of functionality:

- 123d — This application allows you to send and receive data from your thermostat.
- 123e — More info
- 123f — ( Install )

(You can always remove applications later)

| 124 | DATA PROCESSING |
|---|---|

125
- 125a — Transform it
- 125b — Company:    The Transformation company
- 125c — Categories:  Data processing (main)

Short description of functionality:

- 125d — This application combines weather data with historic temperature information from your thermostat application to compute an optimal heating strategy for your house. See 'more info' for supported thermostats.
- 125e — More info
- 125f — ( Install )

(You can always remove applications later)

*Fig. 1B*

| 131 | Sending data to other party request<br><br>An application is requesting to send data to another party. |

| 132 | |
|---|---|
| 132a | Application: Energy monitoring |
| 132b | Manufacturer: Energy provider inc. |

| 133 | Destination: energyprovider.com |

| 134 | Short description of data being sent: |
|---|---|
| 134a | Aggregated monthly energy usage data is sent for energy billing. Data is sent encrypted and aggregated by week to hide personal information. |
| 134b | More info |

| 135 | Your reward: |
|---|---|
| 135a | You will receive a discount of 4% on your energy bill for allowing this data to be sent. |
| 135b | More info |

| 136 | |
|---|---|
| 136a | Allow |
| 136b | Don't allow   (You can always change later) |

*Fig. 1C*

711 — HEALTH CARE SAFE

712 — Please enter your login information for Health Care Safe to send health information to your health care providers.

713 — Username :  ⬚

714 — Password :  ⬚

715 — Security code sent to your mobile phone :  ⬚

716 — ( Update )

*Fig. 7A*

721 — RULE MAKER

722 — Suggested rule 1

723 — Name :  ⬚

724 —
Make sure that before [I usually come home ▼] the temperature in my [living room ▼] is at [the usual temperature ▼] by first [opening the windows ▼] and [lowering the shades ▼]. If that is not enough then [close the windows ▼] and [turn on airconditioning ▼].

732 — ( Apply )

*Fig. 7B*

METHOD AND SYSTEM FOR RECEIVING, PROCESSING, STORING AND SENDING DATA OF INTERNET CONNECTED DEVICES

CROSS-REFERENCE TO RELATED APPLICATIONS

This application claims the benefits of provisional patent application Ser. No. 62/106,484 filed 2015 Jan. 22 by the present inventor.

BACKGROUND

The following is a tabulation of some prior art that presently appears relevant:

| Patent Number | Kind Code | U.S. Patents Issue Date | Patentee |
|---|---|---|---|
| 8,839,022 | B2 | 2014 Sep. 16 | He |
| 7,224,805 | B2 | 2007 May 29 | Hurst et al, |

| | | U.S. patent Applications | |
|---|---|---|---|
| Publication Number | Kind Code | Publication Date | Inventor |
| 2016/0315923 | A1 | Oct. 27, 2016 | Riscombe-Burton et al. |
| 2002/0150243 | A1 | May 29, 2007 | Craft et al. |
| 2008/0066181 | A1 | Mar. 13, 2008 | Haveson et al. |

NONPATENT LITERATURE DOCUMENTS

"Gartner Says the Internet of Things Installed Base Will Grow to 26 Billion Units By 2020" Dec. 12, 2013, Gartner, Inc. http://www.gartner.com/newsroom/id/2636073 [Accessed Jan. 2, 2015]

Porter, Michael E., and James E. Heppelmann. "How Smart, Connected Products Are Transforming Competition." Harvard Business Review 92, no. 11 (November 2014): 64-88

"Unlocking the Value of Personal Data: From Collection to Usage." February 2013, World Economic Forum Report, http://www3.weforum.org/docs/WEF_IT_Unlocking-ValuePersonalData_CollectionUsage_Report_2013.pdf [Accessed Jan. 6, 2015]

Bird, J. "Need-to-know: A guide to the internet of things", FT, May 22, 2013, The Financial Times Ltd. http://www.ft.com/cms/s/0/daf3a2e8-bbc9-11e2-82df-00144feab7de.html [Accessed Jan. 6, 2015]

Higginbotham, S. "CES 2013: Connected Devices and the Internet of Things" Bloomberg Businessweek, Jan. 3, 2013, Bloomberg L. P. http://www.businessweek.com/articles/2013-01-03/ces-2013-connected-devices-and-the-internet-of-things [Accessed Jan. 6, 2015]

Wohlsen, M. "How to Keep the Internet of Things From Repeating AOL's Early Blunders" Wired, Sep. 7, 2014 http://www.wired.com/2014/07/how-to-keep-the-internet-of-things-from-repeating-aols-early-blunders/ [Accessed Jan. 6, 2015]

"Privacy: Hiding from big data." Jun. 7, 2014, Economist Technology Quarterly, 2014 (Q2) http://www.economist.com/news/technology-quarterly/21603233-it-security-increasing-commercial-use-personal-data-and-multiple [Accessed Jan. 6, 2015]

Wohlsen, M. "The Internet of Things Is Far Bigger Than Anyone Realizes." Wired, Nov. 11, 2014 http://www.wired.com/2014/11/the-internet-of-things-bigger/ [Accessed Jan. 6, 2015]

Oram, A. "Hurdles to the Internet of Things prove more social than technical." O'Reily Radar, Feb. 27, 2014, O'Reilly Media, Inc. http://radar.oreilly.com/2014/02/hurdles-to-the-internet-of-things-prove-more-social-than-technical.html [Accessed Jan. 6, 2015]

It is expected that in 2020 there will be more than 30 billion devices connected to the internet. The majority of these devices will not be computers or computer related devices such as smartphones or tablets but existing, commonly known or ordinary products such as cars, bicycles, thermostats, heating or cooling appliances, furniture, light bulbs, power outlets, security systems, kitchen appliances, wall decoration, watches, security systems, buildings and equipment used in agriculture, healthcare, logistics or industrial processes.

The combination of these connected devices is referred to as the Internet of Things (IOT) or Machine to Machine communication (M2M). Both IOT and M2M refer to the combination of a physical object with a sensor, controller and/or actuator being connected to the internet.

The biggest potential for both consumers and business from these connected devises can be realized from combining the data received from multiple and various devices and taking action based on the sum or aggregation of all the received data. In which action is a result in sending of data to the devices, either through human intervention or by some automated process based on a computer algorithm. The same applies to controlling these connected devices, where the biggest potential is realized when multiple devices are controlled through a single action. For example controlling both the air-conditioning and opening and closing of windows based on the combination of historic weather data, temperature readings from sensors in different rooms in the house and the current and historic location of the homeowners car. In this scenario the security system needs to be notified that the windows are opening as a result of climate control instead of home infiltration.

Challenges to the realization of this potential include: privacy and security, combining devices from different vendors, continuously receiving incoming data and taking continuous action based on the automated processing of this data. Privacy and security is of particular interest because the generated data by these devices, and especially the combination of this data, can either contain or be interpreted as sensitive personal or business information. This includes: the location of a person, whether or not a building is occupied or not, financial and production data and healthcare information.

Existing products have been developed to overcome these challenges. These products generally use, or use a combination of the following:

(a) Connecting different devices through a method and system that is shared by all the devices.

(b) Connecting different devices to a dominant or central device, also known as a HUB, in which each device connects to the hub in a different method and system and the HUB acts as a bridge between the different method and systems used by each device.

(c) A service running on a server connected to the internet, in which the service sends and receives data, either from a device connected to the internet or another service—for example in U.S. Pat. No. 8,839,022 (2014) to He. This service on a server connected to the internet is also referred to as 'Platform'. To send data to the service, a technical interface is used to send data to the platform. This technical interface can also be referred to as 'Application Programming Interface' or 'API'. This can involve a combination of different services operated by various parties in which the vendor of a device operates a service that sends and receives data from and to the device and a service from a third party, running on a separate server, receives and sends data to the services operated by the device vendors.

(d) Using a personal device, such as a mobile phone or watch that can send and receive data to each device individually by using a method and system for sending and receiving data where the personal device is within the proximity of a device or set of devices.

These methods and systems, or using a combination of these methods and systems has various downsides.

(a) Using a shared method and system to send data to and from different devices only works if all the devices use the same method and system. Different vendors of devices have created alliances based on a shared method and system. The products from manufacturers within the alliance can connect to other products from manufacturers within the alliance, but not to a product from a manufacturer that is not included in the alliance. This is also known as the creation of ecosystems. As a result sending and receiving data between devices is limited to a set of devices.

(b) No HUB device is able to connect to all available devices or will able to connect to all the devices developed at a future point of time. Finally, when devices send or receive data to each other directly without using the internet or other outside network sending and receiving data is limited to all the devices that are within direct reach of each device.

(c) By using a service running on a server connected to the internet (Platform), data is processed outside the control of the user, the service processes data from different users on the same technical system and it makes it unclear whether the user or the server provider owns the data once the data is processed on the server system. Inventions have been made to secure data and ensure ownership of data, including data stored on server systems. These inventions however only apply to the storage of data on a server and do not apply to the processing of data on a server. Processing data on a server connected to the internet (Platform) presents a threat to both security and privacy. The risk of losing control of personal or sensitive data increases when using a combination of services from different vendors running on servers at multiple locations and/or when data between these servers is sent and received through the internet.

(d) Using a personal device to send and receive data to and from a device within the proximity of the personal device limits receiving and sending data to only those devices that are within the proximity of the personal device. This does not allow for continuously receiving incoming data and taking continuous action based on the automated processing of this data. The example presented above, of controlling the heating and air-conditioning unit based on the location of the home-owner's car will not work, because the personal device is most likely not present in the home, at the time data has to be sent from and received to these appliances.

SUMMARY

An embodiment of the present invention provides a method and system for, under control of the user, receiving, processing and storing data of internet connected devices.

When the server system detects a device, which is requesting to connect to the user environment on the server system, the server system then presents the user with a web page containing the details of this request. The user can subsequently allow or not allow the device to send this data. If the user allows the device to send data the application is searched for correctly receiving, sending and processing data from and to this device. If not allowed the device is blocked from the user environment.

Data from a device received by an application can be further processed by another application. An application running within the individual user environment of the server system can collect and process data from another application within the same environment. These applications can perform one or more tasks and can receive user input directly by providing their own interface to the user. All applications on the server system run within the individually encrypted user environment and therefore no sensitive data needs to be sent over the internet for processing data once the data has been received on the individual user environment.

BRIEF DESCRIPTION OF THE DRAWINGS

FIG. 1A-1C illustrate receiving and sending data, under to control of the user, to an individual user environment in one embodiment of the present invention.

FIGS. 7A-7B are diagrams of embodiments of various application user interfaces of applications running on the user environment on the server system according to the present invention.

DETAILED DESCRIPTION

The present invention provides a method and system for receiving, processing and storing data of internet connected devices, within an individual encrypted user environment.

The system of processing and storing data within an individual encrypted user environment in the present invention reduces the amount of sensitive information transmitted between servers connected to the internet and reduces the number of locations where sensitive information is stored. Putting the environment under the control of the user, including what data is sent and received from and to the environment, increases the privacy of the stored data. By allowing the user to install third party applications on the individual environment, data can be received by, combined and sent to a variety of devices without a shared method and system used by all the devices. The server environment, connected to the internet, allows for the continues processing of data, without the user being near the devices data is received by and send to.

In one embodiment the server system detects a device is requesting to connect to the user environment. The server then presents the client with a web page containing the details of this request. Subsequently the user can either allow or not allow the device to send this data. If the user allows the device to send data the application is searched for correctly receiving, sending and processing the data from and to this device. If not allowed the device is blocked from the user environment. A similar process is used for allowing or not allowing an application on the individual environment to send data to another party outside the environment. The server system detects that a device is requesting to send data to a third party. The server then presents the client with a web page containing the details of this request. The user then can allow or not allow the application to send this data.

An application running on the individual environment can collect and process data from another application on the same environment. A user can search for and install applications form a centralized database. These applications can perform one or more tasks, including receiving and/or sending to a device, receiving and/or sending data to a third party outside the environment, storing data in a database, processing and or combining data from other applications, visualizing data to the user and taking actions based on a set rule or combination of set rules. Applications can receive user input directly by providing their own interface to the user. All applications run within the individual encrypted user environment therefore no sensitive data needs to be sent over the internet for processing data once the data is stored on the user environment.

First Embodiment—FIGS. 1A, 1B, 1C, 2, 3

Figure 1A:
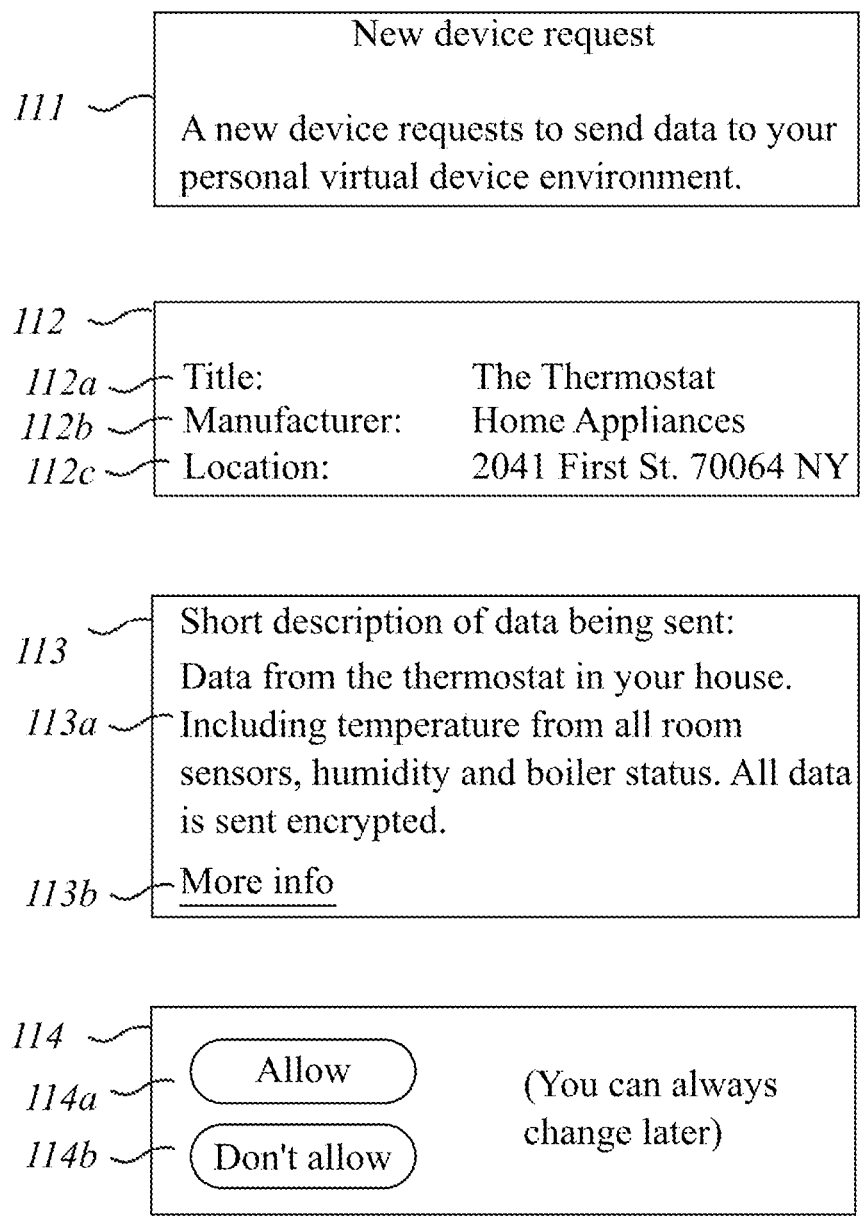

FIGS. 1A-1C illustrate receiving and sending data, under to control of the user, to an individual user environment in one embodiment of the present invention. FIG. 1A illustrates the display of a web page showing the details of a request by a new device to send data to the individual user environment and providing the user with the option to allow or not allow this request in one embodiment of the present invention. The environment recognizes that a device wants to send data. The server then provides the client with a web page. This example web page contains a header 111 explaining to the user why the web page is displayed, information about the device 112, information about the data being sent 113 and two buttons for allowing or not allowing the device to send this data 114. The section on the device 112 contains the title of the device 112a, the manufacturer 112b and optionally the location of the device 112c if the device provides location information. The section on the data being send 113 contains a short description of the data 113a and a link to another web page containing more information of this data 113b. The section for allowing or not allowing the device to send this data 114 contains an 'allow' button 114a and a 'don't allow' button' 114b.

When the user clicks on the 'allow' button 114a the client sends a message to the server to allow this device to send and receive data to and from the user environment. If there are no applications installed on the user environment that can receive or process the data from this device the server system provides the client with a web page that shows the applications the user can install to receive or process the data from this device. FIG. 1B illustrates the display of a web page showing the applications the user can install on the personal environment in one embodiment of the present invention. The server searches and receives information from the central application database and provides the client with a web page of available applications to install and the option to install these applications. This example web page contains a header explaining the web page to the user 121, a category header showing the main category of the applications under this category header for the category 'receiving input' 122 and category 'data processing' 124, two example applications to install, one application in the 'receiving input' category 123 and an application in the 'data processing category 125. The sections on the application to install 123 and 125 contains an application name 123a and 125b, the third party that makes the application 123b and 125b, all the categories of functions this application provides 123c and 125c, a short description of the functionality of the application 123d and 125d, a link to more information on the functionality of the application 123e and 125e, a button for installing the application 123f and 125f. This example web page shows application in two main categories 'receiving input' and 'data processing'. Other categories include 'sending data to others', 'taking action', 'storing data' and 'visualizing data'. Every application has a main category. An application can have one or more additional categories, which shows the functions an application performs. The third party creating the application sets the main category and other categories. The category information for each application is stored in the central application database (not shown).

When the user clicks on the 'install' 123f and 125f button the client sends a message to the server to install the application on the personal environment. If an application, including a newly installed application, tries to send data to a third party outside the user environment the server provides the client a with a web page to allow or not allow this application to send data to this party. FIG. 1C illustrates the display of a web page showing the details of a request by an application on the individual user environment to send data to this third party and providing the user with the option to allow or not allow this request in one embodiment of the present invention. The server system recognizes that an application wants to send data. The server then provides the client with a web page. This example web page contains a header 131 explaining to the user why the web page is displayed, information about the application 132, the destination where the data is to be sent 133, information on the data being send 134, the reward to the user for allowing to sent this data to the third party 135 and two buttons for allowing or not allowing to send this data to the third party 136. The section on the device 132 contains the title of the application 132a, the manufacturer of the application 132b. The section on the data being send contains a short description of the data 134a and a link to another web page containing more information of this data 134b. The section on the reward contains a short description of what the user will receive from the party obtaining the data 135a, if such a reward is provided and a link to another web page containing more information of this reward 135b. The processing of the reward can be performed either within or outside the method and system of this invention. The section for allowing or not allowing sending this data to the third party 136 contains an 'allow' button 136a and a 'don't allow' button' 136b.

Figure 2:
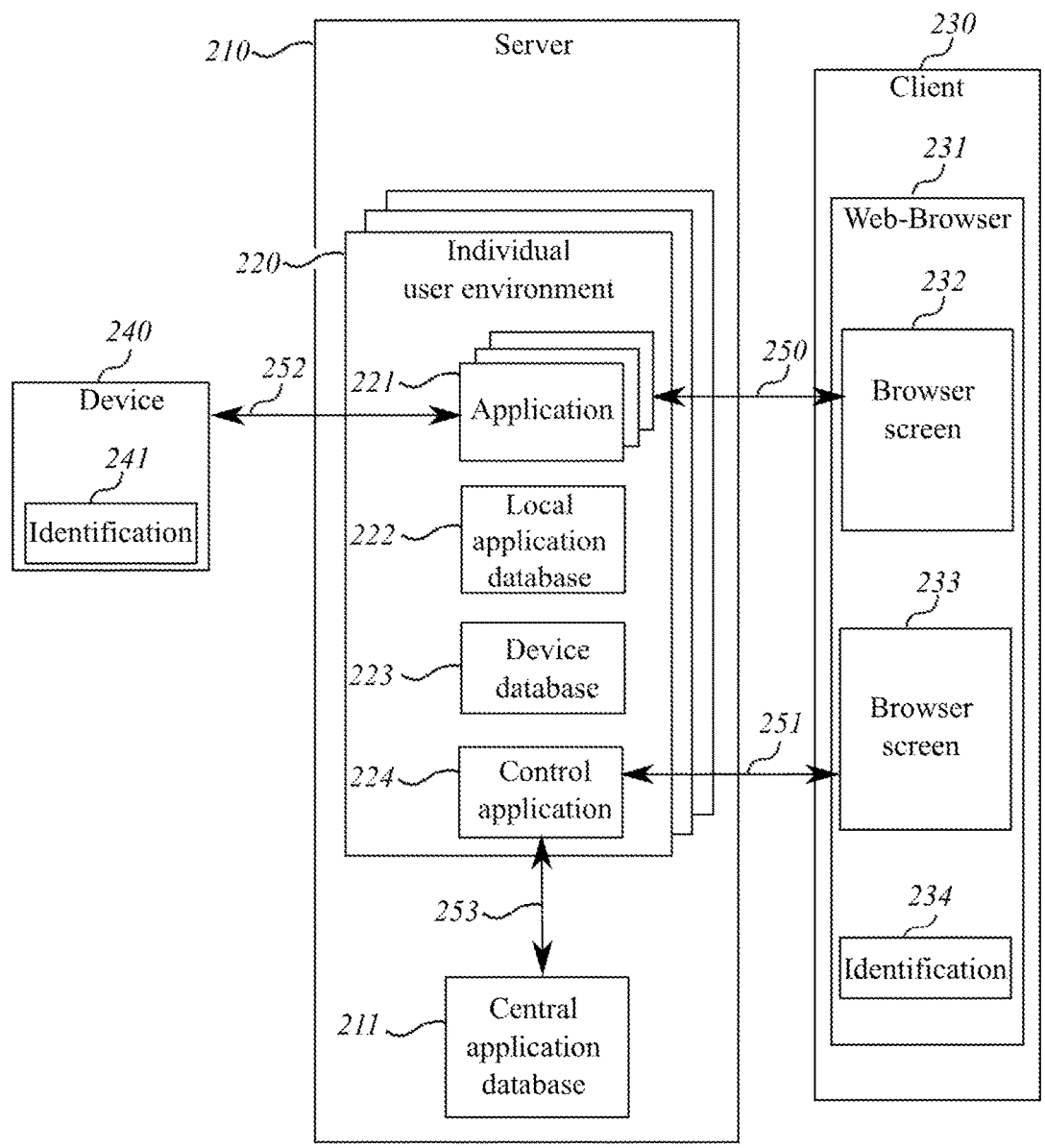
FIG. 2 is a block diagram illustrating an embodiment of the present invention.

FIG. 2 is a block diagram illustrating an embodiment of the present invention. This embodiment supports the processing and storing data received by and sent to internet connected devices within an individual encrypted user environment. The server system 210 contains the separate individual user environments for each user 220 and a central application database 211. Each user environment 210 contains the different applications running within the user environment 221, a local application database for the applications running within the user environment 222, a local device database for the devices connected to the user environment 223 and a special application that provides a user interface to the user to control the user environment 224. The applications running within the user environment 221 running on the server system receive requests from a client system and/or a device 230. Such a request from the client system can include an http request to access web pages from the application. These web pages can include the display of information of a certain data type e.g. a temperature graph, displaying or allowing a rule to be entered to send data to a device based on data stored in the user environment, input-fields for entering personal identification to securely send data to another party outside the user environment and an interface to control a device connected to the user environment by sending data to the connected device e.g. a data signal that tells a light bulb to turn on. A request from a device can include http request to connect to the user environment, a http request to send data to an application or a http request to receive data from an application e.g. receiving user input. The local application database 222 contains a description of the applications that are installed on the user environment, the categories of each application, the application manufacturer, the devices that can connect to this application and the requests each application has made for sending data to another party and the answer to this request made by the user. The device database 223 contains all the devices that have made a request to send and/or receive data to the user environment and the answer to this request made by the user. The control application receives requests from the client system. These can include an http request to access web pages from the control application. These web pages can include the web pages displaying a request made by a device, displaying a request by an application and displaying the information on the applications that can be installed on the user environment. The central application database 211 contains the description of the applications that can be installed on the user environment and the categories of each application, the application manufacturer and the program code for each application that allows the application to be installed on the user environment. The client system 230 contains a web-browser 231. The web-browser 231 contains the browser screen displaying the web pages from the applications 232, the browser screen displaying the web pages from the control application 233 and a client identifier 234. The client identifier 234 is stored in a file is stored in a file or database and contains a unique identifier for the device and the information to connect to the personal user environment. This may include a password or encryption key file. In one embodiment each application, including the control application, can send a separate identifier to the client system when the client first communicates with the application. The device system 240 contains a device identifier 241. The device identifier 241 is stored in a file or database and contains a unique identifier for the device and the information to connect to the personal user environment. This may include a password or encryption key file. The server and the client system interact over a communicating link. The client system only communicates with the applications installed on the individual user environment 250 and the control application 251, which may include an http transmission over the internet. The control application on each user environment connects to the central application database on the server system over a communicating link 252 which may include an http transmission. The server and the device system interact over a communicating link. The device system only communicates with the applications installed on the individual user environment 253 over a communication link. This communication link may include a standard protocol for device communication, such as CoAp (Constrained Application Protocol), XMPP (Extensible Messaging and Presence Protocol), RESTful (ReprEsentational State Transfer full) HTTP, AMQP (Advanced Message Queuing Protocol) or MQTT (Message Queue Telemetry Transport) or a proprietary communication over TCP from the device manufacturer.

Figure 3:
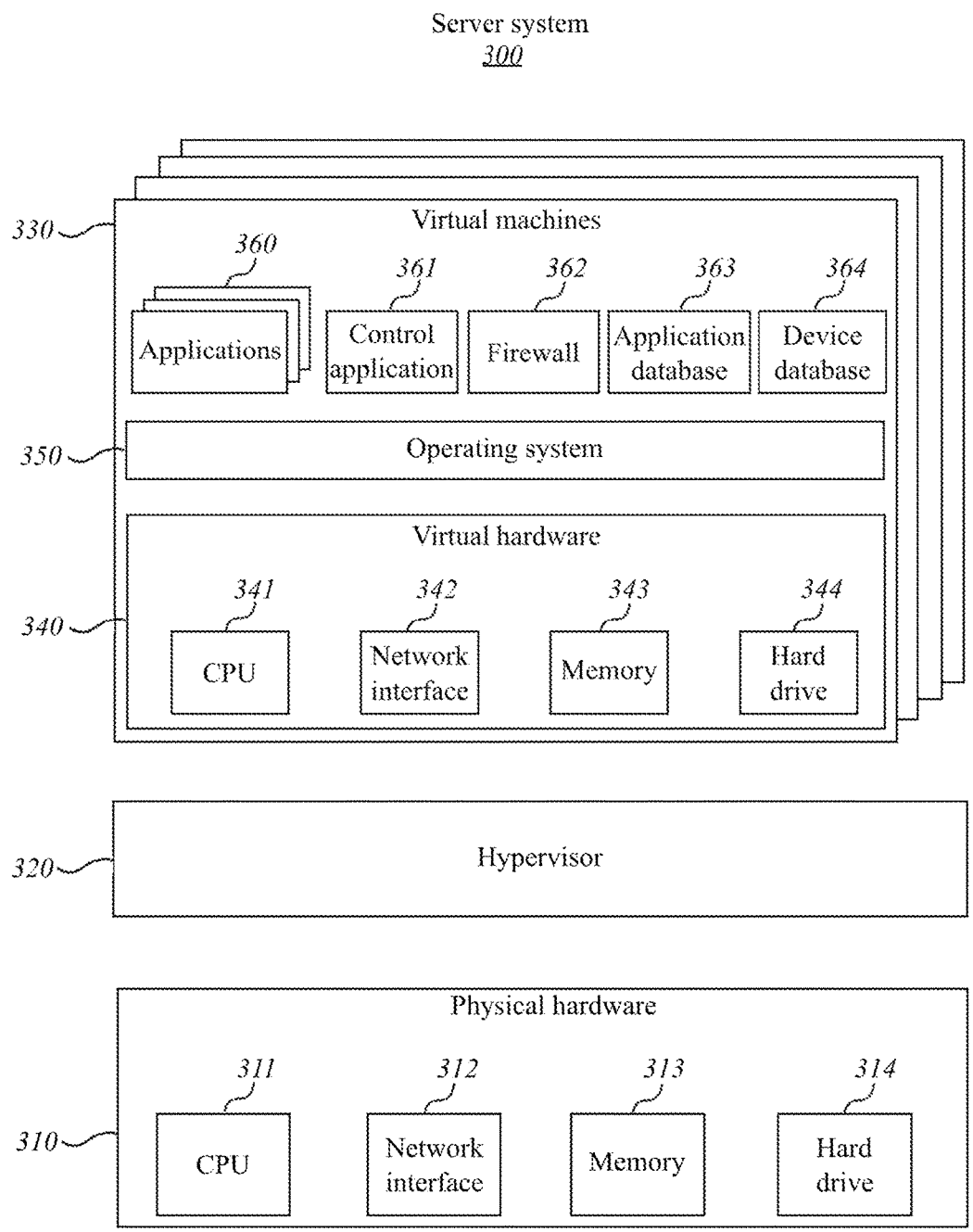
FIG. 3 is a block diagram of a system hosting multiple encrypted individual users spaces according to an embodiment of the invention.

FIG. 3 is a block diagram of a server system hosting multiple encrypted individual user spaces 300 according to an embodiment of the invention. Server system hosting multiple encrypted individual user environments 300 generally includes physical hardware 310, a hypervisor 320 and virtual machines 330. It should be apparent that the architecture shown in FIG. 3 is only one example of an architecture of server system hosting multiple encrypted individual user environments 300 and that server system 300 can have more or fewer components than shown, or a different configuration of components. The physical hardware 310 contains a physical CPU 311, a physical network interface 312, physical memory 313 and a physical hard-drive 314. The components may be coupled by one or more communication busses or signal lines (not shown). The components in the physical hardware can be configured in a cluster of multiple server systems. The hypervisor 320 runs on the physical hardware. The virtual machines 330 run on the hypervisor and provide the individual user environments. The virtual machines contain virtual hardware 340, an operating system 350, the different applications sending and receiving data from and to a client system and devices 360 and specialized applications, including a control application 361, a firewall 362 an application database 363 and the device database 364. The virtual hardware 340 contains a virtual CPU 341, a virtual network interface 342, virtual memory 343, a virtual hard-drive 344. The virtual hard-drive 344 can by encrypted where the encryption key to decrypt the data stored on the virtual hard-drive is only known by the operating system running in the virtual machine 350. The operating system 350 runs on the virtual hardware and can be any suitable operating system, including LINUX, WINDOWS, Mac OS, OS X, RTXS, BSD, UNIX, iOS, Andriod, or a specialized embedded operating system such as QNX OS or QNX Neutrino RTOS. The different applications 360 run on the operating system in the virtual machine. The control application 361, a firewall 362 an application database 363 and the device database 364 also run as an application on the operating system in the virtual machine, but are granted more rights by the operating system to control the personal space itself including: scanning incoming and outgoing data, changing setting is the operating system, installing or removing applications or directly controlling the virtual hardware.

Figure 4:
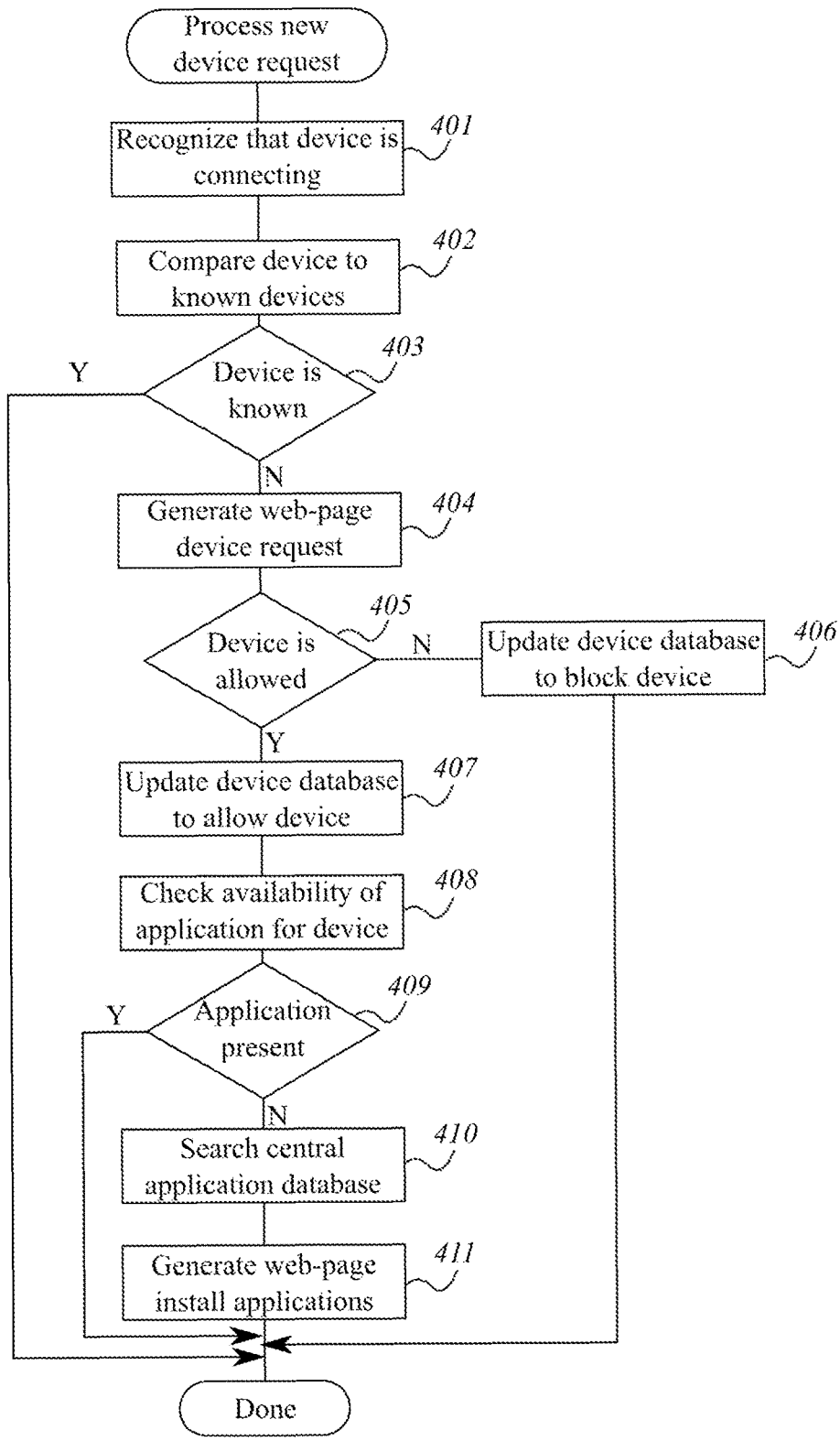
FIG. 4 is a flow diagram of a routine that allows or does not allow a device to connect to the individual user environment.
Figure 5:
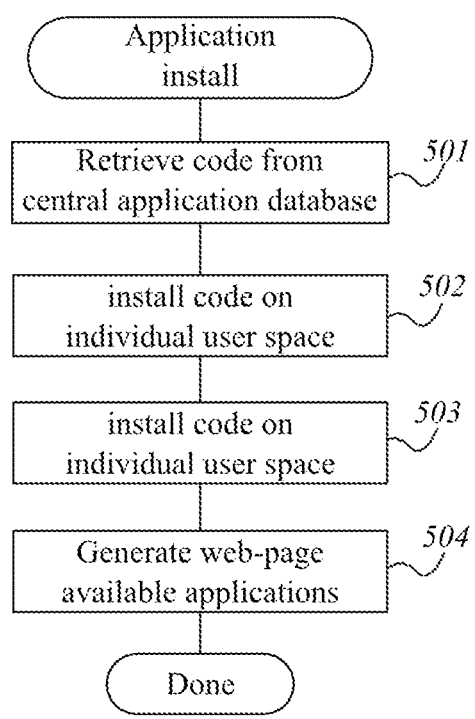
FIG. 5 is a flow diagram of a routine that installs an application to on the individual user environment.
Figure 6:
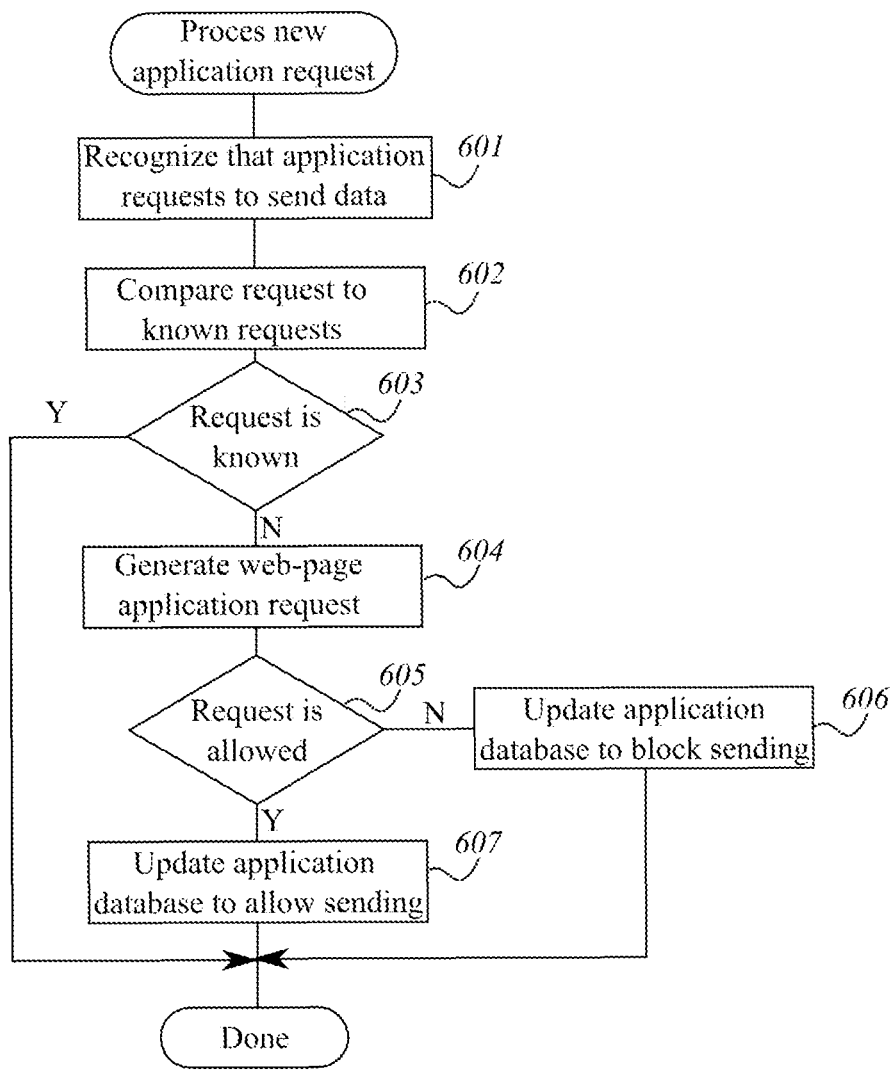
FIG. 6 is a flow diagram of a routine that allows or does not allow an application to send data to a third party outside the user environment.

Operation—FIGS. 4, 5, 6

FIG. 4 is a flow diagram of a routine that allows or does not allow a device to connect to the individual user environment. For this the server system has to recognize a new device is trying to connect. The server system can recognize this in various ways, including by continuously scanning incoming data. In step 401 the server system recognizes that a device is connecting. In step 402 the server system compares this device to the known devices in the device database. In step 403, if the device is already known the server system completes, else the server system continues to step 404. In step 404 the server system generates a web page to display the device request to the user. In step 405, if the user allows the device to connect, by pressing the 'allow' button', the server system continues to step 407, if the user does not allow the device to connect, by pressing the 'don't allow' button, the server system continues to step 406. In step 406 the server system adds a new entry in the device database and sets the decision for this device to 'not allow connecting' and completes. In step 407 the server system adds a new entry in the device database and sets the decision for this device to 'allow connecting'. In step 408 the server system checks in the application database if there is an application installed within the user environment that can receive data from this device. In step 409, if there is an application available the server system completes, else the server system continues to step 410. In step 410 the server system searches the central application database on the server system for applications that can receive data from this device. In step 411 the server system generates a web page for the user displaying all the devices that can be installed for this device and the 'install' button to install this application and completes. The routine of installing the application is illustrated in the flow diagram of FIG. 5.

FIG. 5 is a flow diagram of the application installed on the server system. In step 501 the server system retrieves the code from the central application database on the server system. In step 502 the server system installs the code on the server system. In step 503 the server system adds a new entry to the local application database on the server system. In step 504 the server system generates a web page for the user displaying all the applications that are installed on the server system and completes.

FIG. 6 is a flow diagram of a routine that allows or does not allow an application to send data to a third party outside the user environment. For this the server system has to recognize that an application is trying to send data outside the individual user environment. The server system can recognize this in various ways, including by continuously scanning outgoing data. In step 601 the server system recognizes that an application is trying to send data outside the individual user environment. In step 602 the server system compares this request to the known requests in the application database. In step 603, if the request is already known the server systems completes, else the server system continues to step 604. In step 604 the server system generates a web page to display the application request to the user. In step 605, if the user allows the request, by pressing the 'allow' button, the server system continues to step 607, if the user does not allows the request, by pressing the 'don't allow' button, the server system continues to step 606. In step 606 the server system adds a new entry in the local application database on the server system and sets the decision for this request to 'not allow' and completes. In step 607 the server system adds a new entry in the local application database and sets the decision for this application request to 'allow' and completes.

Figure 8:
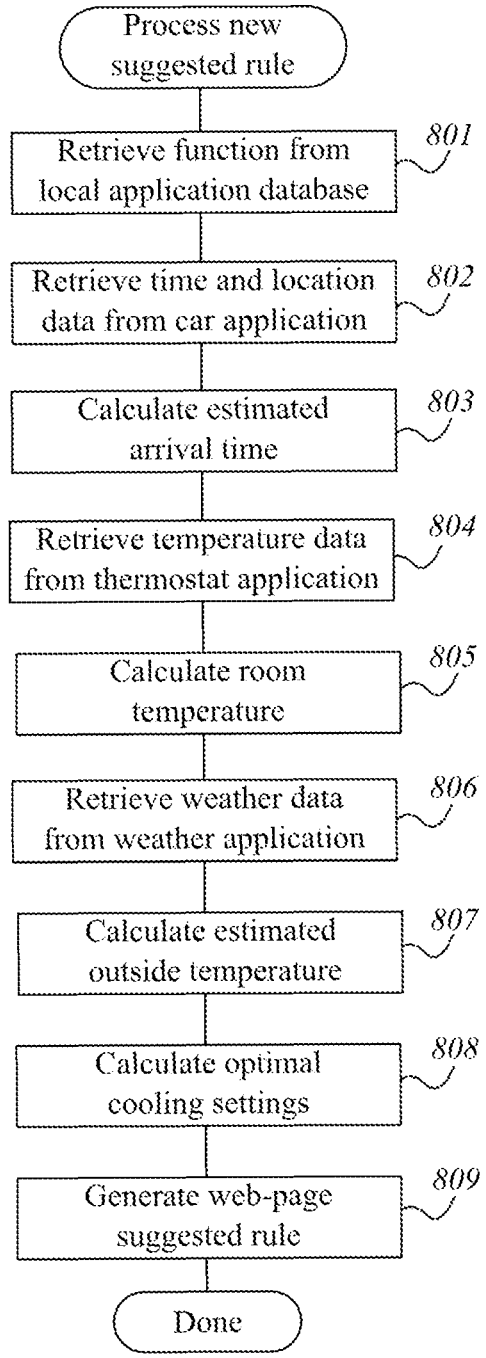
FIG. 8 is a flow diagram of a routine for collection and processing data from an application by another application according to one embodiment of the present invention.

Additional Embodiments—FIGS. 7A, 7B, 8

FIGS. 7A-7B are diagrams of embodiments of various application user interfaces of applications running on the user environment on the server system according to the present invention. FIG. 7A illustrates a web page generated by an application sending data to a third party outside the user environment. This example web page contains the name of the application 711, a short description of the purpose of the application and the action requested from the user 712, an input field to enter a username 713, an input field to enter a password 714, an input field to enter an additional security code sent to the users mobile phone 715 and a button for updating the application with the data entered in the input fields 716. The process of sending the security code to the user's mobile phone can be performed either within or outside the method and system of this invention.

When the user clicks on the 'update' button 716 the client sends a message to the server to the server system to update the information stored in the application with the information entered by the user in the input fields, allowing the application to connect to the third party using the username, password and security code provided by the user. FIG. 7B illustrates a web page generated by an application showing a suggested rule for sending data to a device, or set of devices, based on data stored in the user environment. The example web page shows the name the application 721, the unique number assigned to the rule 722, an input field to enter the name of the rule 723, the suggested rule to be executed by the application 724 and a button for applying the rule, so that the rule will be executed 732. The example suggested rule 724 shows down menus the user can expand to modify the rule, including moment at or before the user wants the action to take place 725, the location to which the rule applies 726, the goal the rule has to achieve 727, the first action to take 728, the second action to take 729 and a first optional action to take 730 and a second optional action to take 731. The pull out menus can contain values derived from other applications, including an estimated time 725, a median sensor value 727 and a type of location 726. When the user clicks on the 'apply' button 732 the client sends a message to the server system to store the rule in the application, allowing the application to periodically process the rule and send data to the applications controlling the connected devices mentioned in the rule.

FIG. 12 is a flow diagram of a routine for collection and processing data from an application by another application according to one embodiment of the present invention. In step 801 the server system retrieves from the local application database which application to use for a function. In step 802 the server system collects data from the application that receives data from a car. In step 803 the server system calculates the estimated arrival time for that day, based on the data collected from the car application. In Step 804 the server system collects data from the application that receives data from a thermostat. In step 805 the server system calculates the desired room temperature based on the data collected from the thermostat. In step 806 the server system collects data from an application that receives weather data over the internet. In step 807 the server system calculates the outside temperature for every hour of the day. In step 808 the server system calculates the rule for optimal cooling settings for different devices. In step 809 the server system generates a web page displaying the suggested rule to the user and completes.

CONCLUSION, RAMIFICATIONS, AND SCOPE

Although the invention has been described in terms of various embodiments, one skilled in the art will recognize that numerous modifications are possible and that features described with specific reference to one embodiment can be applied in other embodiments. Embodiments of the present invention can be applied to other use cases. For example, in a business setting, farming, medical or industrial equipment can send and receive data from and to an individual environment, wherein the individual environment is tied to an organization or individual employee.

Some embodiments of the present invention also provide a user interface to the user, other then a web browser. For example an interface could be provided by an application on a mobile phone, a laptop or desktop computer. These applications could for example use an application specific component for rendering web pages to the user or connect to the individual user environment directly and provide their own interface to the user.

Some embodiments of the present invention can use various and different types of sensors. For example sensors registering light, moisture, air pressure, distance, speed, vibrations, pressure, sound, electrical current, torque or weight. Other embodiments can include sensors sensing a chemical component or sensors collecting medical information, such as example blood pressure, heart rate or body temperature.

Different applications can run on the individual user environment to provide various functions. In some embodiments of the present invention, an application can provide the user an interactive interface. For example a user can zoom and select specific areas of a temperature graph. In some embodiments of the present invention an application can take proactive action. For example sending a warning message to a user if water is sensed in the basement or sending a warning message to a medical provider if the measured hart rate changes. In other embodiments an application has no interface to the user but provides an internal function such as storing or transforming data. Some applications for example can store data in a specific format for easy access by another application or store data in a common format, such as storing all temperature related data in Celsius.

Thus, although the invention has been described in terms of specific embodiments, it will be appreciated that the invention is to cover all modifications and equivalents within the scope of the following claims.

I claim:

1. A method of receiving, storing and processing internet connected device data on a server system, whereby said data remains under control of the user within an individual user environment on said server system, comprising:
   under control of a user-controlled individual user environment component of server system,
   a) recognizing that an internet connected device requests to connect to said individual user environment;
   b) generating a web page presenting said device connect request to the said controlling user of said individual user environment;
   c) in response to action of said controlling user, receiving data form said internet connected device to said individual user environment;
   d) storing said data from said internet connected device within said individual user environment;
   e) searching an application database for applications that contain rules for processing said data from internet connected device;
   f) generating a web page presenting the result of said application search to the said controlling user;
   g) in response to action of said controlling user, installing an application that contains rules for processing said data from internet connected device;
   h) processing said stored data from internet connected device using said rules in installed application within said individual user environment.

2. The method of claim 1 wherein the receiving data from said internet connected device contains data obtained from a sensor in said internet connected device.

3. The method of claim 1 wherein the receiving data from said internet connected device contains data on the status of said internet connected device.

4. The method of claim 1 wherein an internet connected device is a physical device.

5. The method of claim 1 wherein an internet connected device is a web-service running on a different server system than said server system containing said individual user environment.

6. The method of claim 1 wherein an internet connected device is said individual user environment on the same server system, under control from a different user than the said user controlling the said individual user environment receiving the said data.

7. A server system for, under control of the user, receiving, storing and processing data comprising:
   a) an individual user environment component for isolating data storage and data processing;
   b) a receiving component for receiving data from an internet connected device to the said individual user environment;
   c) a storing component for storing said data from said internet connected device in said individual user environment;
   d) a searching component for searching for applications that contain rules that process data from said internet connected device;
   e) an installing component for installing applications that contain rules for processing said stored data from said internet connected device said individual user environment;
   f) a processing component for processing said stored data, received from said internet connected device, using rules for said installed application within said individual user environment;
   g) a rendering component for generating web pages to the controlling user for allowing internet connected devices to send data to said individual environment and allowing for installing applications on said individual environment.

8. The method of claim 7 wherein receiving said data from said internet connected device connected contains data obtained from a sensor in said internet connected device.

9. The method of claim 7 wherein receiving said data from said internet connected device contains data on the status of said internet connected device.

10. The method of claim 7 wherein an internet connected device is a physical device.

11. The method of claim 7 wherein an internet connected device is a web-service running on a different server than said server system containing said individual user environment.

12. The method of claim 7 wherein an internet connected device is said individual user environment on the same server system, under control from a different user than the user controlling said individual user environment receiving the said data.

* * * * *